United States Patent [19]

Colvin et al.

[11] 4,048,075
[45] Sept. 13, 1977

[54] FILTER CARTRIDGE

[75] Inventors: Floyd E. Colvin; John E. Luttrell, both of Tell City, Ind.

[73] Assignee: The Carborundum Company, Niagra Falls, N.Y.

[21] Appl. No.: 537,974

[22] Filed: Jan. 2, 1975

Related U.S. Application Data

[63] Continuation of Ser. No. 467,433, May 6, 1974, abandoned, which is a continuation of Ser. No. 334,531, Feb. 22, 1973, abandoned, which is a continuation-in-part of Ser. No. 185,621, Oct. 1, 1971, abandoned.

[51] Int. Cl.² .............................................. B01D 27/00
[52] U.S. Cl. ................................ 210/484; 210/494 R; 427/244
[58] Field of Search ............... 210/493, 494, 496, 497, 210/497.1, 497 H, 484, 485; 55/520, 528; 427/244; 156/148

[56] References Cited

U.S. PATENT DOCUMENTS

| | | | |
|---|---|---|---|
| 2,742,160 | 4/1956 | Fogwell | 210/494 X |
| 3,065,856 | 11/1962 | Goldman | 210/494 |
| 3,261,473 | 7/1966 | Riede | 210/494 |
| 3,398,837 | 8/1960 | Adams | 210/496 |
| 3,450,632 | 6/1969 | Olson et al. | 210/23 |
| 3,470,028 | 9/1969 | Sizer, Jr. et al. | 136/86 |
| 3,471,028 | 10/1969 | Miller et al. | 210/489 X |

FOREIGN PATENT DOCUMENTS 1,208,567  10/1970  United Kingdom

*Primary Examiner*—John Adee
*Attorney, Agent, or Firm*—David E. Dougherty; Robert C. Weber

[57] ABSTRACT

A filter cartridge or element for separating particles from fluid flowing inwardly through the cartridge, and a process for making the same, such cartridge having a central perforated inner tubular core member with a pre-formed mat of non-woven fibrous filter material having a width substantially equal to the length of the core member and wrapped around only the core member and itself in a continuous spiral layer to form a roll of the mat. The roll mat of filter material is contained or confined by an open mesh material such as that formed by a substantially single layer of a strand of roving wound in an open criss-cross or open diamond weave pattern around only the outer periphery of the material of the rolled mat and itself so as to maintain a permanent dimensional and structural stability or integrity during subsequent handling and use.

8 Claims, 2 Drawing Figures

INVENTOR.
FLOYD E. COLVIN
BY  JOHN E. LUTTRELL

FILTER CARTRIDGE

CROSS REFERENCES TO RELATED APPLICATIONS

This application is a continuation of our copending application Ser. No. 467,433, filed May 5, 1974, now abandoned, which is a continuation of our copending application Ser. No. 334,531, filed Feb. 22, 1973, now abandoned, which is a continuation-in-part application of our copending application Ser. No. 185,621, filed Oct. 1, 1971, now abandoned.

BACKGROUND OF THE INVENTION

1. Field of Invention

This invention pertains to the art of filtration wherein disposable filter cartridges are employed to clarify a variety of liquids or gases where the inward flow of particle laden fluid customarily penetrates the outer surface of the cartridge and then emerges from the inner surface to be carried away along the interior of a tubular core. The invention relates to an improved filter cartridge that is dimensionally and structurally stable, simple to construct, and which gives unexpectedly good performance in terms of filtration efficiency and useful life.

Filter cartridges can be conveniently classified into two fundamental types, (a) the pleated sheet or surface filtration type, and (b) the bulk or in depth filtration type. The present invention belongs in the second category.

One type of filter cartridge that is widely known and has received wide reception and usage is that described in detail by Goldman, in U.S. Pat. No. 1,958,268, the cartridge being formed by winding a continuous strand or roving of fibrous material around a central perforated core in criss-cross fashion in a sufficient number of layers to create a filter cartridge of the desired diameter. The resulting structure is provided with a multiplicity of helically disposed, diamond-shaped openings extending radially inward from the outer peripheral surface of the filter media to the core. As the strand or roving of fibrous material is being wound onto the core, it is subjected to a napping operation to pull a certain amount of the fibers away from the strand or roving so as to create a network of fine fibrous material across the diamond-shaped openings. It is essentially this napped fibrous material pulled from the strands or roving that performs the filtering function, and the superimposed layers of stranded material are relied upon to hold the napped material in place so that it will function effectively. This technique of napping and securing of the napped material is difficult to control to the extent necessary to be totally reliable and to provide uniform filtering capability throughout the filter material, as well as resulting in an obvious weakening of the strands or roving.

More recently a variation of the same type of filter cartridge has been described by Goldman in U.S. Pat. No. 3,065,856, in which an apparent effort was made to avoid the deficiencies and draw backs of the napping technique. In this patent, Goldman has described a filter cartridge made by laying down a stranded material or roving, while simultaneously depositing a thin fibrous membrane between each layer of the roving from the core to the outer periphery to provide a filtering septum in place of the napped portion of the fibers. However, the provision of this added component throughout the structure of the filter material results in further undesirable expense and complexity of fabrication. Another cartridge filter design has been described by Fogwell in U.S. Pat. No. 2,742,160, in which a mat of filter material is wound around a core. While being wound, the mat is carried on a supporting fabric-like material which covers one face and both sides of the mat. As in the Goldman patent, the provision of support material adds to the expense and complicates the fabrication of the resulting filter cartridge.

Other less expensive types of fibrous or granular filter cartridges have been found unsatisfactory for many filtering purposes for one or more reasons, such as lack of uniformity and consequent unreliability, shortness of life expectancy, or failure to provide the permanent integrity and strength of structure and lasting dimensional and structural stability to be found in the above-described stranded or roving design.

It is an object of the present invention to provide for the first time a fibrous filter cartridge and a process for making the same, wherein such cartridge is facile and economical to fabricate, and at the same time will provide in its structure the desirable reliability of uniformity of filtering performance while retaining a dimensional stability and integrity heretofore found only in more complicated filters.

It is also an object of this invention to provide a simple fibrous filter element or cartridge and process for making the same, wherein such cartridge combines a high filtering capacity with respect to both the volume of fluid and effective filtering life.

It is a still further object of this invention to provide a filter cartridge and process for making the same, wherein such cartridge is especially adapted for the effective filtration of paints and similar products for extraction of particles of a selected range of particle size.

These and other objects and advantages of the present invention will become apparent from the following detailed description.

SUMMARY OF THE INVENTION

This invention provides a filter element or cartidge for separating particles from fluid flowing inwardly through the cartridge, and a process for making the same, wherein the improvement comprises: an inner tubular perforated metal or plastic core element or member (which includes an open mesh wire screen core element or member) and a layer or pre-formed needle punched mat of non-woven unbonded fibrous filtering material having a width substantially equal to the length of the core member and wrapped in a continuous spiral layer around only the core member and itself to form a roll of the mat, followed by a fibrous or filamentary strand or roving wound around only the outer periphery of the roll and itself, in a criss-cross open weave pattern to form an open mesh network containing the roll to hold the filtering materials in place and thereby impart permanent dimensional stability to the filtering element or cartridge. In making such cartridge, the mat is mounted on and rotated with a mandrel, whereupon the mat is so wrapped and the strand is so wound.

DESCRIPTION OF THE INVENTION

Figure 1:
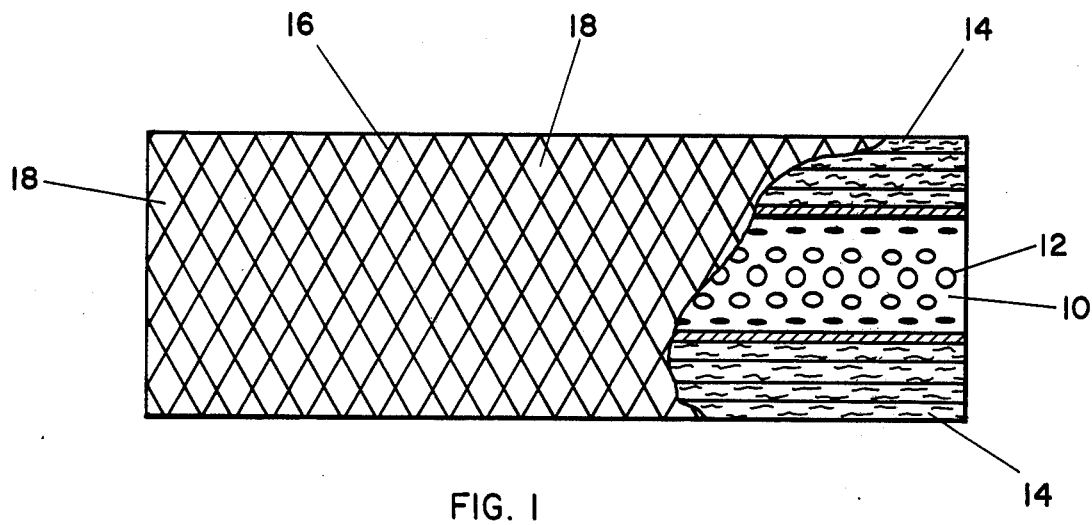
FIG. 1 is a side elevational view of the filter element or cartridge, partly in section.

In the filter cartidge or element shown in FIG. 1, 10 is an inner tubular core member of material such as metal, plastic or the like having a plurality of perforations 12 therethrough. If desired, the core may be a tube of woven wire 20, as shown in FIG. 3. The cartridge is formed by mounting the core on a suitable holder or mandrel, with the core and mandrel being rotated together while the pre-formed mat of non-woven fibrous filtering material 14 is wound or wrapped in a continuous spiral layer around only the core member and itself to form a roll of the mat and thereby a filter element or cartridge of the desired diameter and length. While a commonly used diameter is about 2.3 to 2.4 inches, the cartridges of the invention are not restricted to this range but may be of larger or smaller diameter as required. Also, while cartridges of about 10 inches in length are commonly made, cartridges of much lesser or greater length can be fabricated in similar manner. The mat of filter material is a full width web or layer of needled or bonded fibers substantially equal in width to the length of the core member. Methods for preparing the web or layer, before winding, may involve well known textile operations such as those of separating the fibers, laying the fibers in random orientation to form a web or layer, and optionally needle punching the web or layer to give added coherence and strength. The webs or layers of fibrous material as laid down on the core may range in thickness from about $\frac{1}{8}$ to about $\frac{1}{2}$ inch, with a thickness of about $\frac{1}{4}$ inch being preferred.

The fibrous material used in the filter of the invention may comprise fibers of polymeric materials such as viscose rayon, polyamids, polyesters, polyurethanes, polyethylenes, polypropylenes, polytetrafluoroethylene, polyvinyls and the like. Natural fibers such as those of cellulose, wool, silk and linen may be employed as well as inorganic glass and ceramic fibers and fibers of metallic composition, such as stainless steel and similar chemically resistant alloys. The fibers may be of continuous filamentary form or of random staple lengths. Fiber length is not considered as important as fiber diameter, since length becomes of more concern only when the fibers are closely packed. Short fibers pack more closely together and form a denser fibrous mass. The longer fibers with curls (or crimp) do not pack as easily, although this is an advantage when a more permeable mass is desired.

Fiber diameters are important and may range from about 0.01 micron (glass fibers) to about 100 microns (sisal fibers). The smaller fibers are used in constructing filters which would, for example, separate bacteria and virus-sized particles from fluids. The large diameter fibers are used for constructing sieve-like cartridges which, for example, will separate large objectionable particles from paint while permitting the passage of fine pigment particles in the range of 1 to 2 microns and sometimes greater in diameter. Intermediate size fibers, of the size most commonly employed in textile operations, are used in making filters of general interest such as those for use with hydraulic cooling and lubrication fluids, fuel oils, and fluids in general such as various industrial liquids and gases.

The structural strength of the mass of fibers, in a mat (or in a roll of the mat) is a function of (a) packing density (b) the strength and elasticity of the individual fibers along with their "curliness" (c) how well the fibers are entangled, and (d) whether or not the fibers are chemically treated to either bond them together, to make the individual fibers rigid, or to alter the surface characteristics of the fibers. In preparing a cartridge of the present invention from a mat of fiber, the mat may be made strong enough for handling by either a needle punching operation or by means of a chemical bonding treatment, such as in the case of very small diameter fibers such as glass. By packing density is meant the quotient: bulk density/individual fiber density. The range of packing densities which are practical are about 0.03 to about 0.30. A filter cartridge prepared by tightly winding textile roving alone around a core has this higher density. Cartridges with a packing density below about 0.03 do not have fibers close enough together for practical use. Packing densities of about 0.06 to about 0.2 are preferred.

Figure 2:
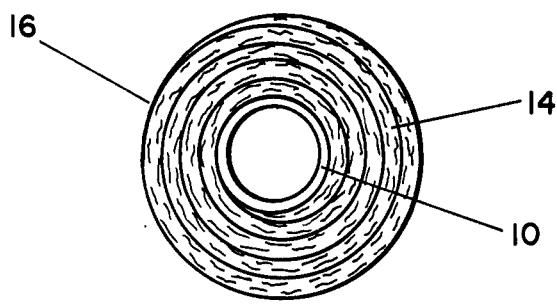
FIG. 2 is an end view of the element or cartridge.

An end view of the filter element or cartridge of the invention is shown in FIG. 2 which shows the spiral configuration of the layers after winding the mat of filtering material 14 on the core. During the winding operation, this material may be held against the core by a pressure plate or roller, the winding mandrel being provided with end plates (not shown), the distance between which is identical to the length of the filter core. Before the last end of the mat reaches the wrapping operation, a strand material, such as a textile roving, is placed on the winding mass. By means of suitable back tension and use of a traversing guide, the strand material is wrapped to form a criss-cross open network of the strand material around the outer mat layer to hold it in place and retain the dimensional stability and integrity of the filter material. The last loose end of the strand is tucked under one or more previous turns of this strand to complete the construction and hold the roving in place. While the advantages of the greater facility of applications and lower costs of confining this filter material by use of a criss-cross outer winding of a strand or roving material is lost, it is evident that such outer roving may be replaced, if desired, by confining the non-woven filter material by means of a tightly fitting outer sleeve of open mesh strand material 22.

The finished filter cartridge is shown in FIG. 1 in which the strand or roving is shown at 16 and the apertures between the strands at 18. This pattern is one that gives a considerable amount of open area to the apertures 18, since the prime purpose of the winding is to mechanically contain the filtering material and impart permanent structural integrity to the filtering material. The filter element or cartridge, following formation thereof, may optionally then be impregnated with an appropriate chemical treatment which may impart specifically desirable characteristics to the fibrous mass, such as, the use of appropriate thermo-setting or thermo-plastic resins for making the individual fibers more rigid, or making them adherent to one another. By making the fibers more rigid, as opposed to bonding the fibers together, the permeability of the cartridge does not appreciably change. It is known that the use of resins to bond the fibers together increases the pressure drop because the resin occupies otherwise void space and decreases filtration efficiency. The chemical treatment may also be one which alters the surface properties of the fibers, such as for example, making the fiber surfaces hydrophobic or hydrophillic.

The construction and testing of a typical cartridge filter element of the invention is described in the following examples:

EXAMPLE 1

A 1-inch-diameter, 10-inch-long, perforated, sheet-steel cylinder (the filter core) was placed on a mandrel fitted with 3-inch-diameter plates touching the ends of the core. An unbonded mat of textile fiber was then wrapped around the core in the following manner. The mat was 10 inches wide, about ¼ inch thick, about 7 feet long and weighed about 100 gms. It was previously prepared from 3-denier rayon staple by a 3-step textile operation that (1) separated the fibers, (2) randomly laid them into a mat, and (3) needle punched the mat to give it integrity.

As the mandrel turned to pull the mat around the core, a pressure plate was held against the increasing-diameter mass in order to provide the necessary force to insure that the final cartridge diameter was about 2.35 inches. Before the end of the mat reached the winding mass, the leading end of a strand of rayon roving was placed within the mat end. Since the roving was fed to this revolving mass via a tension plate and a traversing eye, the end result was that the mat became wrapped with a neat, criss-cross pattern of strands. The final end of the roving was tucked under some previous turns.

The ends of the cartridge were smooth and relatively firm; and although one could deliberately pull away individual or groups of fibers, Example 2 below shows that when this cartridge was tested in a housing, making use of a knife-edge ring pressed against the cartridge ends, there was neither "by-passing" of filter solids, nor cases where fibers broke loose and entered the filtrate.

EXAMPLE 2

The performance of the filter cartridge of Example 1 was measured by using a standard liquid and a finely divided solid, both of which are commonly employed in filtration testing operations. The liquid was identified as standard calibrating fluid MIL-F27351 and the solids as AC Fine Test dust. The housing in which the test cartridge was placed sealed the ends of the cartridge by means of a knife-edge ring which was 1.7 inches in diameter.

When test liquid at 100° F was passed through the cartridge at the rate of 200 gal/hr. the pressure drop across the cartridge was 0.75 psi. When test dust was present in the fluid stream, the filter cartridge removed 99.50% of the weight of the test dust. As the mixture of test liquid and dust continued to feed to the cartridge, the pressure drop across the cartridge increased as the following cumulative amount of test dust was fed to it:

| Grams of Test Dust | Pressure drop PSI |
|---|---|
|  | 0.75 |
| 10 | 0.80 |
| 20 | 0.95 |
| 30 | 1.4 |
| 35 | 2.0 |
| 40 | 3.0 |
| 45 | 20.0 |
| 50 | 48.0 |

During the time the pressure drop across the cartridge rose to 50 psi the cartridge did not unload any accumulated test dust; and it continued to function as an effective filter. If we arbitrarily say the cartridge life is over when the pressure drop reaches 20 psi, then we can also say that the dirt-holding capacity of the cartridge was 45 grams × 99.5% = 44.8 grams. Such performance demonstrates that this cartridge did in fact perform as well as other cartridges of more costly and complicated structure, such as that described in Example 3.

EXAMPLE 3

The cartridge in this example for comparison was one of the type described in U.S. Pat. No. 3,065,856 and was comparable in length and diameter with the filter cartridge of Example 1. Its method of construction consists of wrapping a strand of rayon roving around a core while at the same time applying a relatively loose membrane of cotton fiber, which, in effect, fills the holes defined by the winding pattern of the rayon roving. The resulting cartridge was very firm and rugged looking. For a comparison of this type of cartridge with one of our present invention, we chose for testing a cartridge with the same pressure drop as the invention cartridge of Example 1 and 2. The filtration efficiency of this referenced cartridge was only 95.7%. The pressure drop across this cartridge (during passage of 200 gal/hr. test fluid) rose from an initial value of 0.75 psi to 20 psi after 53 grams of test dust had been fed to it. Thus the dirt holding capacity was 53 g × 95.7% = 50.6 g.

As the two examples above show, the cartridge of the present invention performed essentially as well as the more intricately fabricated cartridge of the prior art, but it was a superior filter for the pressure drop in removal effectiveness. It is well known in the art that dirt-holding capacity increases with a decrease in filtration efficiency. By the proper choice of fiber diameters and packing density of the filter material, filter cartridges of varying porosities may be made which can function effectively in many types of filtration applications. These may range from the ultra fine filtration of bacteria and virus sized particles up to sieve-like filters which function to pass particles of small diameters while removing undesirable residues and large diameter particles from fluidic suspensions, as in the filtering of paints.

What is claimed is:

1. A filter cartridge for separating particles from fluid flowing inwardly through the cartridge, wherein the improvement consists essentially of: an inner tubular perforated core member; a pre-formed needle punched mat of non-woven unbonded fibrous filtering material having a width substantially equal to the length of said core member and wrapped in a continuous spiral layer around only said core member and itself, to form a roll of said mat; and a strand wound in a criss-cross open weave pattern around only the outer periphery of said roll and itself to form an open mesh network containing said roll.

2. A filter cartridge for separating particles from fluid flowing inwardly through the cartridge, wherein the improvement consists essentially of: an inner tubular perforated core member; a pre-formed needle punched mat of non-woven fibrous filtering material having a width substantially equal to the length of said core member and wrapped in a continuous spiral layer around only said core member and itself, to form a roll of said mat; and a strand wound in a criss-cross open weave pattern around only the outer periphery of said roll and itself to form an open mesh network containing said roll; said cartridge, following formation thereof, being impregnated with resin to make the fibers of said roll more rigid without appreciably affecting the permeability of said cartridge.

3. The filter cartridge of claim 1, wherein the fibers of said mat have a diameter range from about 0.01 micron to about 100 microns, and said roll has a packing density range from about 0.06 to about 0.2.

4. The filter cartridge of claim 2, wherein the fibers of said mat have a diameter range from about 0.1 micron to about 100 microns, and said roll has a packing density range from about 0.06 to about 0.2.

5. A process for making a filter cartridge for separating particles from fluid flowing inwardly through the cartridge wherein the improvement consists essentially of the steps of: mounting a tubular perforated core member on a mandrel; rotating the core member and mandrel together; wrapping a pre-formed needle punched mat of non-woven unbonded fibrous filtering material having a width substantially equal to the length of said core member in a continuous spiral layer around only said core member and itself, to form a roll of said mat; and winding a strand in a criss-cross open weave pattern around only the outer periphery of said roll and itself, to form an open mesh network containing said roll.

6. The process of claim 5, including the step of impregnating said cartridge, following formation thereof, with resin to make the fibers of said roll more rigid without appreciably affecting the permeability of said cartridge.

7. The process of claim 5, wherein the fibers of said roll have a diameter range from about 0.01 micron to about 100 microns, and said roll has a packing density range from about 0.06 to about 0.2.

8. The process of claim 7, including the step of impregnating said cartridge, following formation thereof, with resin to make the fibers of said roll more rigid without appreciably affecting the permeability of said cartridge.

* * * * *